United States Patent Office 3,295,974
Patented Jan. 3, 1967

3,295,974
LIGHT SENSITIVE EPOXY MATERIAL FOR THE PHOTOMECHANICAL PRODUCTION OF PRINTING PLATES
Fritz Erdmann, Wiesbaden-Schierstein, Germany, assignor, by mesne assignments, to Azoplate Corporation, Murray Hill, New Jersey
No Drawing. Filed Oct. 23, 1964, Ser. No. 406,151
Claims priority, application Germany, Oct. 25, 1963, K 51,181
12 Claims. (Cl. 96—35)

The present invention relates to a light-sensitive material for use in the photomechanical production of printing plates of the type comprising a support having a light-sensitive coating which, when exposed image-wise to light becomes hardened in the exposed areas.

The invention provides a light-sensitive material of the above type for use in the photomechanical production of printing plates, in which the light-sensitive coating consists entirely or partially of at least one epoxy resin of the formula:

$$CH_2\text{—}CH\text{—}CH_2\text{—}(O\text{—}A\text{—}B\text{—}A\text{—}O\text{—}CH_2\text{—}CHOH\text{—}CH_2)_n\text{—}O\text{—}A\text{—}B\text{—}A\text{—}O\text{—}CH_2\text{—}CH\text{—}CH_2$$
$$\underset{O}{\diagdown\diagup} \qquad \qquad \underset{O}{\diagdown\diagup}$$

in which A is the group

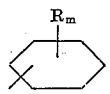

B is an aliphatic chain, containing at least 3 and preferably not more than 6 carbon atoms, which may contain substituent lower alkyl groups, in which the grouping

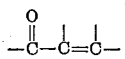

occurs at least once and in which one C—C single bond may be interrupted by the group

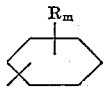

R is an alkyl, cycloalkyl, alkenyl, alkoxy, carbalkoxy or nitro group, a carboxyl, sulfonic acid or phosphonic acid group in the form of a salt, or a halogen atom, $m$ is 0 or a whole number not exceeding 4, and $n$ is 0 or a whole number. R is preferably a straight or branched-chain lower alkyl or alkenyl group, a lower alkoxy group, a nitro group, or a chlorine or a bromine atom. In cases wherein $m$ in $R_m$ is a whole number in excess of 1, the groups R linked to the phenylene group may be the same or different. $n$ is preferably between 1 and 12 but may sometimes be higher, for example up to 35. The unlocalized free valence bond in the above formula for the group A indicates that the bonds of this group to the oxygen atom and to the group B may be in o-, m- or p-position with respect to the phenylene group.

Epoxy resins of the above formula are new compounds. These epoxy resins are condensation products which may be prepared by the reaction of epichlorhydrin and an unsaturated aromatic ketone of the formula

HO—A—B—A—OH in which A and B are as stated above.

The simplest way of preparing such ketones is by condensation of a phenolic aldehyde, for example o-, m- or p-hydroxybenzaldehyde or o-, m- or p-hydroxyphenylacetaldehyde, or an aromatic dialdehyde, such as terephthalic dialdehyde, with an alkyl-hydroxyphenyl ketone, for example o-, m- or p-hydroxyacetophenone or o-, m- or p-hydroxyphenylethyl ketone. The aforementioned unsaturated aromatic ketones may also be prepared by condensing two molecules of a phenolic aldehyde with one molecule of an aliphatic ketone which contains two active methyl or methylene groups attached to the carbonyl group, for example acetone or methyl ethyl ketone. Thus, when p-hydroxybenzaldehyde is condensed with p-hydroxyacetophenone in the molar ratio 1:1, a compound of the formula HO—A—B—A—OH is obtained, in which B is the group —CH=CH—CO—. When terephthalic dialdehyde is condensed with p-hydroxyacetophenone in the molar ratio 1:2, B in the resulting ketone is the group

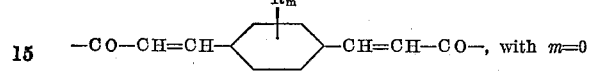

When p-hydroxybenzaldehyde is condensed with acetone in the molar ratio 2:1, B in the resulting ketone is the group —CH=CH—CO—CH=CH.

The epoxy resins of the aforementioned formula may be applied, in solution in an organic solvent, to the support of the light-sensitive material, which may consist of metal, paper or a plastic film, by dipping, spraying, roller application or by application to the rotating support. The solution may contain 0.1 to 10 percent by weight, and preferably 0.5 to 3 percent by weight, of the epoxy resin or mixtures of epoxy resins.

Exemplary of suitable solvents are esters, such as butyl acetate; ketones, such as methyl ethyl ketone, acetophenone and cyclohexanone; ethers, such as diisopropyl ether, tetrahydrofuran and dioxane; alcohols, such as n-butanol, n-hexanol and cyclohexanol; diol ethers, such as glycolmonomethyl ether or glycolmonoethyl ether; acid amides, such as dimethylformamide; sulfoxides, such as dimethylsulfoxide; and aromatic hydrocarbons, such as benzene, toluene and xylene.

The solution may also contain known additives, for example inhibitors, such as hydroquinone or hydroquinone monomethylether, fillers, plasticizers, dyes and sensitizers. The solution may also contain another light-sensitive substance appropriate for inclusion in light-sensitive materials for the production of printing plates, for example an azide or a diazo compound, in particular a diazo compound formed by the reaction of formaldehyde with a diazonium salt of a p-amino-diphenylamine. The amount of such light-sensitive substance will not normally exceed the amount of epoxy resin and is generally substantially smaller than the amount of the latter.

The sensitized printing plate may be exposed, after drying, under a negative original to a light source which emits ultra-violet radiation. The exposure time required is dependent on the type and distance of the light source and is of the order of several minutes. For example, the printing plate may be exposed under a negative original, in a vacuum-backed copying frame, for 2 to 5 minutes to an arc lamp of 40 amperes at a distance of 70 cm.

The epoxy resin becomes cross-linked in the areas exposed to light and thereby hardened. As a result, these portions of the coating become insoluble in the aforementioned organic solvents. The unexposed parts of the coating remain soluble and can be removed by wiping over with the solvent, which may, if required, be mixed with water and may also contain a small amount of a suitable salt, for example an alkali metal halide or alkaline-earth halide, a phosphate, a silicate, a chromate, a sulfate or a mixture of such salts. The hardened epoxy resin remains adherent to the support in the exposed areas so that, after inking up with greasy ink and, if required, treatment with a solution to render more hydrophilic the uncoated parts of the support, a large number of prints can be produced in an offset printing machine.

The advantage of the light-sensitive material according to the invention, which is particularly suitable for planographic printing, is that the epoxy resin remaining in the exposed areas of the plate is highly resistant to rubbing and to chemicals. A highly resistant printing image is therefore obtained from which long runs of prints, for example 50,000, can be obtained, if desired after removal of the unexposed parts of the coating, the remaining epoxy resin can be further hardened by treatment with a bifunctional amine, e.g. diethylenetriamine, or with an organic acid or acid anhydride, e.g. phthalic acid anhydride.

Additional hardening of the epoxy resin during exposure can be effected by incluison in the coating of a potential hardener, i.e. a compound which reacts with the epoxy resin with further cross-linking. When such a potential hardener is included in the coating, the aforementioned further hardening by treatment with an amine or an acid can be eliminated.

Exemplary of suitable potential hardeners are carboxylic acid azides, quinone diazides, especially o-quinone diazides, and diazo ketones. As is known, upon exposure to ultra-violet light these compounds are converted into very reactive secondary products with nitrogen being split-off. Thus, carboxylic acid azides yield isocyanates, and quinone diazides and diazo ketones yield ketones. The free hydroxyl groups of the epoxy resin then link to the reactive double bonds of these decomposition products.

Exemplary of suitable carboxylic acid azides are aromatic carboxylic acid azides, such as terephthalic acid diazide, which is converted into phenyl diisocyanate during exposure. Exemplary of suitable quinone diazides are o-benzoquinone diazides and o-naphthoquinone diazides.

The potential hardener is normally incorporated in the coating in an amount by weight, based on the epoxy resin, of 5 to 50 percent, preferably 10 to 25 percent. It is generally added to the solution containing the epoxy resin before application of the solution to the support.

As noted above, the epoxy resin can be prepared by reaction of unsaturated aromatic ketone of the formula $$HO—A—B—A—OH$$

with epichlorhydrin. The condensation should be carried out in the presence of a basic condensation agent, for example an alkali metal or alkaline-earth metal hydroxide, a tertiary amine, a quaternary ammonium base or mixtures of such compounds. Water and/or an organic solvent such as dioxane or an aliphatic alcohol may be added as an aid to solution. The formulae of 29 suitable unsaturated aromatic ketones are given in the following table:

TABLE

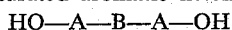

| | Structure | M.P., °C |
|---|---|---|
| 1 | HO—⟨⟩—CH=CH—CO—⟨⟩—OH | 197 |
| 2 | HO—⟨⟩—CH=CH—CO—CH=CH—⟨⟩—OH | 235–237 |
| 3 | HO—⟨⟩—CO—CH=CH—⟨⟩—CH=CH—CO—⟨⟩—OH | 289–292 |
| 4 | HO—⟨⟩(CH₃)(CH₃)—CH=CH—CO—⟨⟩—OH | 189 |
| 5 | ⟨⟩(HO)—CH=CH—CO—⟨⟩—OH | 236 |
| 6 | HO—⟨⟩(CH₃)(CH₃)—CH=CH—CO—⟨⟩—OH | 233 |
| 7 | HO—⟨⟩(CH₃)(CH(CH₃)₂)—CH=CH—CO—⟨⟩—OH | 185 |
| 8 | HO—⟨⟩(C(CH₃)₃)(C(CH₃)₃)—CH=CH—CO—⟨⟩—OH | 189 |
| 9 | HO—⟨⟩(CH₂=CH—CH₂)—CH=CH—CO—⟨⟩—OH | 157 |

TABLE—Continued

| | | M.P., °C. |
|---|---|---|
| 10 | HO–⌬(CH₃O)–CH=CH–CO–⌬–OH | 224 |
| 11 | CH₃O–⌬(HO)–CH=CH–CO–⌬–OH | 213 |
| 12 | HO–⌬(CH₃O)(NO₂)–CH=CH–CO–⌬–OH | 230 |
| 13 | HO–⌬(O₂N)–CH=CH–CO–⌬–OH | 279 |
| 14 | HO–⌬(O₂N)(O₂N)–CH=CH–CO–⌬–OH | 252 |
| 15 | HO–⌬(Cl)(Cl)–CH=CH–CO–⌬–OH | 278 |
| 16 | HO–⌬(Br)(Br)–CH=CH–CO–⌬–OH | 264 |
| 17 | HO–⌬–CH=CH–CO–⌬(CH₃)–OH | 167 |
| 18 | HO–⌬–CH=CH–CO–⌬(CH₃)(CH₃)–OH | 208–209 |
| 19 | HO–⌬–CH=CH–CO–⌬(CH₃–CH–CH₃)(CH₃)–OH | 158.5 |
| 20 | HO–⌬–CH=CH–CO–⌬(CH₃)(CH(CH₃)₂)–OH | 197 |
| 21 | HO–⌬–CH=CH–CO–⌬(C₆H₅)–OH | 208 |
| 22 | HO–⌬–CH=CH–CO–⌬(Cl)–OH | 210 |
| 23 | HO–⌬–CH=CH–CO–⌬(NO₂)–OH | 215 |

TABLE—Continued

| | | M.P., °C. |
|---|---|---|
| 24 | HO—⟨C₆H₄⟩—CH=CH—CO—⟨C₆H₂(NO₂)₂⟩—OH | 280 |
| 25 | HO—⟨C₆H₃(CH₃)⟩—CH=CH—CO—⟨C₆H₃(CH₃)⟩—OH | 200 |
| 26 | HO—⟨C₆H₂(CH₃)₂⟩—CH=CH—CO—⟨C₆H₃(CH₃)⟩—OH (with CH₃ substituents) | 200 |
| 27 | HO—⟨C₆H₃(CH₃O)⟩—CH=CH—CO—⟨C₆H₃(CH₃)⟩—OH | 177 |
| 28 | HO—⟨C₆H₃(CH₃O)⟩—CH=CH—CO—⟨C₆H₃(CH(CH₃)₂)⟩—OH | 135 |
| 29 | HO—⟨C₆H₃(CH₃O)⟩—CH=CH—CO—⟨C₆H₃(NO₂)⟩—OH | 220 |

In the course of the reaction, which is generally conducted at a temperature between 60 and 150° C., the yellow to orange-colored epoxy resin precipitates from the initially homogeneous solution. The melting range or melting point of the resin is between 60 and 350° C., and the molecular weight is generally between 650 and 13,000. The chain length and molecular weight of the weight of the resin can be varied by varying the proportions of epichlorhydrin and unsaturated aromatic ketone used in the condensation. The reaction temperature also has an influence on the molecular weight, which generally increases with an increase in the reaction temperature. The average molecular weight of the compounds can be found by end group determination as described in the literature, for example in "Kunststoffe," 51 (1961), No. 11, page 714, et seq.

In the following examples, parts by weight are in grams and parts by volume are in ml. The formulae referred to are those shown in the table above.

Example 1

In part by weight of a beige-yellow epoxy resin having a molecular weight of approximately 1200 and a melting range of 185–187° C., and prepared by reaction of the compound of Formula 1 with epichlorhydrin, is dissolved in 100 parts by volume of a mixture of 2 parts by volume of dimethylformamide/3 parts by volume of ethyleneglycolmonomethylether (hereinafter referred to simply as "methylglycol"). A mechanically roughened aluminum foil is coated with this solution and then dried with warm air. The sensitized foil is exposed under a negative original for 3 minutes to a carbon arc lamp (40 amperes) at a distance of 70 cm. in a vacuum frame. Development is effected with dimethylformamide/methylglycol (ratio 2:3), i.e. the aforementioned solvent mixture, which dissolves the unexposed parts of the coating. The developed foil is rinsed with water and wiped over with 1 percent by weight phosphoric acid in order to increase the hydrophilic properties of the support material. Inking up with greasy ink and printing in a printing machine can then be performed and long runs achieved.

Example 2

0.75 part by weight of an orange-yellow epoxy resin having a molecular weight of approximately 3400 and melting range of 80–120° C., and prepared by reaction of the compound of Formula 27 with epichlorohydrin, and 0.75 part by weight of a yellow epoxy resin having a molecular weight of approximately 2500 and a melting range of 80–120° C., and prepared by reaction of the compound of Formula 7 with epichlorhydrin, are dissolved in 100 parts by volume of a mixture of dimethylformamide/methylglycol (ratio 2:3). An aluminum foil having an electrolytically roughened surface is coated with this solution, dried as in Example 1, and then exposed under a negative original. After development with triethylene glycol, wiping over with 1 percent phosphoric acid and inking up, an image is obtained from which a large number of copies can be produced in a conventional printing machine.

Example 3

1 part by weight of a pale yellow epoxy resin having a molecular weight of approximately 1600 and a melting point exceeding 250° C., and prepared by reaction of the compound of Formula 1 with epichlorhydrin, 0.1 part by weight of hydroquinone as an inhibitor, and 0.01 part by weight of methylene blue as a sensitizer are dissolved in 100 parts by volume of the solvent mixture used in Example 1. An electrolytically roughened aluminum foil is coated with this solution. After drying for 2 minutes at 100° C., the foil is exposed under a negative original for 3 to 5 minutes to a carbon arc lamp. The unexposed, non-polymerized and non-hardened parts of the coating are then removed by treatment with triethylene glycol. The remaining hardened oleophilic image yields long printing runs in a conventional printing machine.

*Example 4*

1 part by weight of a pale yellow epoxy resin, having a molecular weight of approximately 5800 and a melting point of 120° C., and prepared by reaction of the compound of Formula 22 with epichlorhydrin, 0.1 part by weight of bis-(p,p'-diazidobenzal)-acetone and 0.2 part by weight of terephthalic acid diazide as a potential hardener are dissolved in 100 parts by volume of the solvent mixture used in Example 1 and used to form a film on an electrolytically roughened aluminum foil. This material yields, after exposure and development, an excellent image from which numerous copies can be produced. Similarly, good images and copies are obtained when reaction products of the compounds of Formulae 9, 19, or 25 with epichlorhydrin are used instead of the aforementioned resin. The resin prepared with 9 is lemon-yellow, has a molecular weight of approximately 2200, and a melting point at 65° C.; the resin prepared with 19 is pale yellow, and has a molecular weight of approximately 1700 and a melting range of 60–90° C.

*Example 5*

1 part by weight of a yellow epoxy resin, having a molecular weight of approximately 2500 and a melting range of 80–120° C., and prepared by reaction of the compound of Formula 7 with epichlorhydrin, 0.1 part by weight of benzoin-methylether and 0.1 part by weight of hydroquinone are dissolved in 100 parts by volume of the solvent mixture used in Example 1 and applied to a roughened aluminum foil, which, after drying, is exposed under a negative original. Development is then effected with triethylene glycol, the plate is treated with dilute phosphoric acid and inked up with greasy printing ink. Numerous copies can be printed from the image so obtained.

If instead of the above-mentioned resin the reaction products of the compounds of Formula 27 and/or 21 with epichlorhydrin are used, similarly good images and copies can be produced. The resin prepared with No. 27 is orange-yellow, has a molecular weight of approximately 3400, and a melting range of 80–120° C., the resin prepared with No. 21 is pale yellow, has a molecular weight of approximately 1500 and a melting range of 80–100° C.

*Example 6*

2 parts by weight of a yellow epoxy resin having a molecular weight of approximately 10,000 and a melting point of 130° C., and prepared by reaction of the compound of Formula 5 with epichlorhydrin, and 0.3 part by weight of terephthalic acid diazide are dissolved in 100 parts by volume of the solvent mixture used in Example 1 and applied to an eloxated aluminum foil as a coating. After drying, exposure is effected in a conventional manner and development is effected with diethyleneglycol monoethylether. In order to increase the hydrophilic properties of the support, it is wiped over with 1 percent phosphoric acid containing 0.5 percent sodium fluoride in solution, and inked up with greasy printing ink. During subsequent printing, very long runs are obtained.

Comparably long runs are obtained with reaction products of the compounds of Formulae 28, 17 or 22 with epichlorhydrin. The resin prepared with No. 28 is lemon-yellow, has an approximate molecular weight of 2200, and a melting point of 80° C., the resin prepared with No. 17 is yellow, has an approximate molecular weight of 4200 and a melting range of 80–130° C.; the resin prepared with No. 22 is pale yellow, has an approximate molecular weight of 5800, and a melting point of 130° C.

*Example 7*

1 part by weight of a yellow epoxy resin, having a molecular weight of approximately 2500 and a melting range of 80–120° C., and produced by reaction of the compound of Formula 7 with epichlorhydrin, 0.5 part by weight of a commercial epoxy resin obtained by reaction of epichlorhydrin with 2,2-bis-(4'-hydroxyphenyl) propane and 0.3 part by weight of terephthalic acid diazide are dissolved in 100 parts by volume of a mixture of dimethylformamide/methyl ethyl ketone (ratio 1:1), a roughened aluminum foil is coated therewith and, after drying, the foil is exposed in a conventional manner. Development is effected with triethylene glycol and excellent images are obtained from which large numbers of copies can be printed.

*Example 8*

1 part by weight of an orange-yellow epoxy resin having a molecular weight of approximately 3600 and a melting range of 94–105° C., and prepared by reaction of the compound of Formula 10 with epichlorhydrin are dissolved in 100 parts by volume of a solvent mixture of methylglycol/dimethylformamide (ratio 3:2). A paper foil is coated with this solution. Exposure is effected under an arc lamp and development is effected with a lacquer as described in Belgian Patent No. 625,786. Several thousand copies can be produced from the resulting plate.

*Example 9*

0.5 part by weight of a lemon-yellow epoxy resin having a molecular weight of approximately 1600 and a melting range of 80–120° C., and prepared by reaction of the compound of Formula 10 with epichlorhydrin, and 0.5 part by weight of a condensation product of diphenylamine-4-diazonium chloride, paraformaldehyde and 85 percent phosphoric acid are dissolved in 100 ml. of a solvent mixture of methylglycol/dimethylformamide (ratio 3:2) and whirl-coated onto an aluminum foil. Exposure is effected for 3–5 minutes under an arc lamp, development is effected with a lacquer as in Example 8, and excellent copies can be produced in a printing machine.

The formaldehyde condensation product was prepared by adding 1.3 parts by weight of paraformaldehyde and 10.4 parts by weight of diphenylamine-4-diazonium chloride to 10 parts by volume of 85 percent phosphoric acid and heating the reaction mixture at 40° C. for 35 hours, with stirring.

*Example 10*

1 part by weight of a beige-yellow epoxy resin having a molecular weight of approximately 1200 and a melting range of 185–187° C., and prepared by reaction of the compound of Formula 1 with epichlorhydrin, and 0.15 part by weight of 1-((4'-methylbenzene - 1' - sulfonyl)-imino) - 2 - (2'',5''-dimethylphenyl-aminosulfonyl)-benzoquinone-(1,4)-diazide-(4) are dissolved in 100 ml. of the solvent mixture used in Example 9 and a roughened aluminum foil is coated therewith. The same procedure is then followed as in Example 9 and, after developing with diethylene-glycolmonoethylether, copies as good as those of Example 9 are obtained.

*Example 11*

0.5 part by weight of a beige-yellow epoxy resin having a molecular weight of approximately 1200 and a melting range of 185–187° C., and prepared by reaction of the compound of Formula 1 with epichlorhydrin, and 0.5 part by weight of 4,4'-diazidostilbene-2,2'-disulfonic acid are dissolved in 100 ml. of the solvent mixture used in Example 9 and whirl-coated onto a roughened aluminum foil. Exposure is effected as described in Example 9 and, after development, copies are obtained whose quality corresponds to that of the copies obtained according to Example 10.

Example 12

4 parts by weight of a yellow epoxy resin having a molecular weight of approximately 1500 and a melting range of 80–140° C., and prepared by reaction of the compound of Formula 10 with epichlorhydrin, are dissolved in 96 parts by volume of a solvent mixture consisting of dimethyl formamide and N-methyl-pyrrolidone, in a ratio of 1:1, and whirl-coated onto the chromium layer of a commercial trimetal plate consisting of layers of chromium, copper and aluminum. The coated layer is then exposed for 10 minutes to an arc lamp under a positive master, developed with a solvent mixture made up of 5 parts by volume of diethyleneglycol monoethyl ether and 4 parts by volume of triglycol, rinsed with water, and finally dried with a current of warm air. The chromium in the areas bared by the developing process is then etched away until the underlying copper layer becomes visible. The etching solution used consists of:

| | Percent by wt. |
|---|---|
| $CaCl_2 \cdot 6H_2O$ | 60.33 |
| $ZnCl_2$ | 19.14 |
| $NH_4Cl$ | 1.01 |
| Tartaric acid (cryst.) | 3.02 |
| Hydrochloric acid (d–1.18) | 2.72 |
| $H_2O$ | 13.77 |

The hardened polymer layer remaining on the chromium surface is removed by decoating with N-methyl-pyrrolidone-2. The plate is then inked with greasy ink. From a printing plate prepared in this manner, long runs of first quality prints may be obtained.

Example 13

A yellow epoxy resin having a molecular weight of approximately 1500 and a melting range of from 95 to 140° C. was prepared by reacting the compound of Formula 10 with epichlorhydrin. 7.5 parts by weight of this resin were dissolved, with 0.23 part by weight of Zapon Fast Blue HFL (Color Index 74 350) and 0.15 part by weight of Zapon Fast Red 3B (Color Index 16 260 and 45 170) in a solvent mixture consisting of dimethyl formamide, tetrahydrofurane, glycol monoethyl ether, toluene, and N-methyl-pyrrolidone in proportions of 30:30:36:3:1 parts by volume. A commercial zinc plate was coated with this solution and dried. The material thus obtained was exposed for ten minutes to the light of an arc lamp under a negative master and then developed with a developer consisting of 1 part by volume of diethylene glycol monoethyl ether and 9 parts by volume of triglycol. A blue colored image was obtained. A relief printing plate was then prepared by etching an etching machine, using nitric acid of about 6 percent concentration to which Isodurol (1,2,3,5-tetramethyl benzene) had been added for protection of the side walls of the relief image. From the printing plate thus prepared very long runs of excellent copies could be obtained in a relief printing process.

Example 14

A yellow epoxy resin having a molecular weight of about 1200 and a melting range of from 90 to 125° C. was prepared by reacting the compound of Formula 10 with epichlorhydrin. Five parts by weight of this resin were dissolved in 100 parts by volume of the solvent mixture used in Example 13, and the solution thus obtained was coated onto a bimetal plate consisting of layers of copper and aluminum, and dried. The plate was then exposed for ten minutes under a negative master to a carbon arc lamp and developed with triethylene glycol. The copper was then etched away by means of a commercial etching solution for bimetal plates, i.e. "PDI-Lithengrave Etch" or an about 45 percent ferric nitrate solution, until the underlying aluminum layer became visible. From the printing plate thus obtained, long runs of copies could be produced.

Example 15

A yellow epoxy resin having a molecular weight of approximately 1200 and a melting range of from 180 to 190° C. was prepared by reacting the compound of Formula 1 with epichlorhydrin. One part by weight of this resin was dissolved in 100 parts by volume of a solvent mixture consisting of dimethyl formamide and glycol monomethyl ether in a proportion of 2:3 parts by volume. This solution was coated onto a superficially saponified cellulose acetate film. The coated film was exposed for about 2 minutes to the light of a carbon arc lamp, developed with triethylene glycol, rinsed with water, and inked up with greasy ink. Ink receptivity was very good, and the printing plate thus obtained could be used for printing long runs in an offset printing machine.

It will be obvious to those skilled in the art that many modifications may be made within the scope of the present invention without departing from the spirit thereof, and the invention includes all such modifications.

What is claimed is:

1. Light-sensitive material comprising a base material having a light-sensitive coating thereon, the latter comprising at least one epoxy resin having the formula

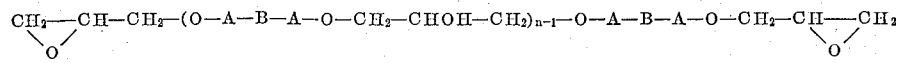

in which A is the group

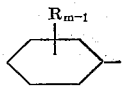

B is an aliphatic group having at least 3 carbon atoms, which group may be substituted by alkyl groups, in which the group

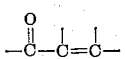

occurs at least once and in which one carbon-to-carbon single bond may be interrupted by the group

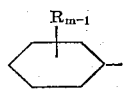

R is selected from the group consisting of alkyl, cycloalkyl, alkenyl, alkoxy, carbalkoxy and nitro groups and carboxyl, sulfonic acid and phosphonic acid groups in the form of a salt, and halogen, $m$ is an integer from 1 to 5, and $n$ is an integer.

2. Light-sensitive material according to claim 1 in which the aliphatic group B has no more than six carbon atoms, exclusive of substituent groups.

3. Light-sensitive material according to claim 1 in which the light-sensitive coating contains about 5 to 50 percent by weight, based upon the weight of the epoxy resin, of a compound selected from the group consisting of a carboxylic acid azide, a quinone diazide, a diazo ketone, and mixtures thereof.

4. Light-sensitive material according to claim 1 in which the light-sensitive coating includes a minor amount of another light-sensitive substance in addition to the epoxy resin.

5. Light-sensitive material according to claim 4 in which the other light-sensitive substance is a diazo compound formed by the reaction of an aldehyde with a diazonium salt of a p-amino-diphenylamine.

6. A process for developing light-sensitive material which comprises exposing a supported light-sensitive coating to light under a master and developing the resulting image with a developer solution, the coating comprising at least one epoxy resin having the formula CH₂—CH—CH₂—(O—A—B—A—O—CH₂—CHOH—CH₂)ₙ₋₁—O—A—B—A—O—CH₂—CH—CH₂
   \\_O_/                                                              \\_O_/ in which A is the group

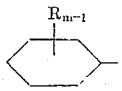

B is an aliphatic group having at least three carbon atoms, which group may be substituted by alkyl groups, in which the group

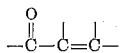

occurs at least once and in which one carbon-to-carbon single bond may be interrupted by the group

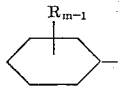

R is selected from the group consisting of alkyl, cycloalkyl, alkenyl, alkoxy, carbalkoxy and nitro groups and carboxyl, sulfonic acid and phosphonic acid groups in the form of a salt, and halogen, $m$ is an integer from 1 to 5, and $n$ is an integer.

7. A process according to claim 6 in which the aliphatic group B has no more than six carbon atoms, exclusive of substituent groups.

8. A process according to claim 6 in which the light-sensitive coating contains about 5 to 50 percent by weight, based upon the weight of the epoxy resin, of a compound selected from the group consisting of a carboxylic acid azide, a quinone diazide, a diazo ketone, and mixtures thereof.

9. A process according to claim 6 in which the light-sensitive coating includes a minor amount of another light-sensitive substance in addition to the epoxy resin.

10. A process according to claim 9 in which the other light-sensitive substance is a diazo compound formed by the reaction of an aldehyde with a diazonium salt of a p-amino-diphenylamine.

11. A compound having the formula

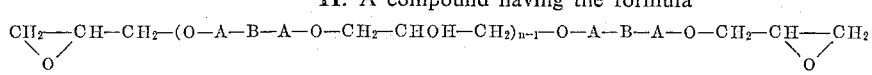

in which A is the group

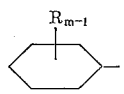

B is an aliphatic group having at least three carbon atoms, which group may be substituted by alkyl groups, in which the group

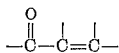

occurs at least once and in which one carbon-to-carbon single bond may be interrupted by the group

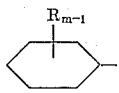

R is selected from the group consisting of alkyl, cycloalkyl, alkenyl, alkoxy, carbalkoxy and nitro groups and carboxyl, sulfonic acid and phosphonic acid groups in the form of a salt, and halogen, $m$ is an integer from 1 to 5, and $n$ is an integer.

12. A compound according to claim 11 in which the aliphatic group B has no more than six carbon atoms, exclusive of substituent groups.

References Cited by the Examiner
UNITED STATES PATENTS

| | | | |
|---|---|---|---|
| 3,043,802 | 7/1962 | Thoma et al. | 96—115 |
| 3,058,946 | 10/1962 | Nametz. | |
| 3,140,270 | 7/1964 | Thoma et al. | 96—115 |

NORMAN G. TORCHIN, *Primary Examiner.*

ALEXANDER D. RICCI, *Examiner.*